United States Patent
Rapp

(10) Patent No.: US 9,588,633 B2
(45) Date of Patent: *Mar. 7, 2017

(54) PREVENTING THE INCLUSION OF A REFERENCE TO A HOST CELL IN A FORMULA

(75) Inventor: Peter William Rapp, Pittsburgh, PA (US)

(73) Assignee: APPLE INC., Cupertino, CA (US)

( * ) Notice: Subject to any disclaimer, the term of this patent is extended or adjusted under 35 U.S.C. 154(b) by 168 days.

This patent is subject to a terminal disclaimer.

(21) Appl. No.: 13/350,710

(22) Filed: Jan. 13, 2012

(65) Prior Publication Data

US 2012/0117454 A1    May 10, 2012

Related U.S. Application Data

(63) Continuation of application No. 11/890,650, filed on Aug. 6, 2007, now Pat. No. 8,161,373.

(51) Int. Cl.
*G06F 17/00* (2006.01)
*G06F 3/0481* (2013.01)
*G06F 17/24* (2006.01)

(52) U.S. Cl.
CPC .......... *G06F 3/0481* (2013.01); *G06F 17/246* (2013.01); *G06F 17/24* (2013.01); *G06F 17/245* (2013.01)

(58) Field of Classification Search
CPC ....... G06F 17/246; G06F 17/24; G06F 17/245
USPC .................................................. 715/212–227
See application file for complete search history.

(56) References Cited

U.S. PATENT DOCUMENTS

| | | | |
|---|---|---|---|
| 5,276,607 A * | 1/1994 | Harris et al. .................. 345/467 |
| 5,790,435 A * | 8/1998 | Lewis et al. .................. 716/102 |
| 2005/0091206 A1* | 4/2005 | Koukerdjinian et al. ........ 707/3 |
| 2006/0048044 A1* | 3/2006 | Genesereth et al. .......... 715/503 |
| 2009/0083615 A1* | 3/2009 | Kotler et al. ................. 715/219 |

OTHER PUBLICATIONS

Abraham et al. "Inferring Templates from Spreadsheet"—Published May 20-28, 2006 by ACM—pp. 182-191.*

* cited by examiner

*Primary Examiner* — Quoc A Tran
(74) *Attorney, Agent, or Firm* — Fletcher Yoder PC

(57) ABSTRACT

Preventing the inclusion of a reference to a host cell in a formula to avoid a circular reference in the formula is disclosed. In some embodiments, an indication of an attempted user gesture for inserting into a formula being entered into a host cell a reference to the host cell is received, and the attempted user gesture for inserting a reference to the host cell is disallowed to prevent a circular reference from being inserted into the formula being entered into the host cell.

20 Claims, 4 Drawing Sheets

|   | A | B | C | + |
|---|---|---|---|---|
| 1 | 3 |   |   |   |
| 2 | 5 |   |   |   |
| 3 | 1 |   |   |   |
| 4 | 9 |   |   |   |
| 5 | 6 |   |   |   |
| 6 | =| ⊗ ✓ |   |   | + |
| + |   |   |   |   |

FIG. 1A

|   | A | B | C | + |
|---|---|---|---|---|
| 1 | 3 |   |   |   |
| 2 | 5 |   |   |   |
| 3 | 1 |   |   |   |
| 4 | 9 |   |   |   |
| 5 | 6 |   |   |   |
| 6 | =SUM( ⊗ ✓ |   |   | + |
| + |   |   |   |   |

FIG. 1B

|   | A | B | C | + |
|---|---|---|---|---|
| 1 | 3 |   |   |   |
| 2 | 5 |   |   |   |
| 3 | 1 |   |   |   |
| 4 | 9 |   |   |   |
| 5 | 6 |   |   |   |
| 6 | =SUM(A1:A5) ⊗ ✓ |   |   | + |
| + |   |   |   |   |

FIG. 1C

|   | A | B | C | + |
|---|---|---|---|---|
| 1 | 3 |   |   |   |
| 2 | 5 |   |   |   |
| 3 | 1 |   |   |   |
| 4 | 9 |   |   |   |
| 5 | 6 |   |   |   |
| 6 | 24 |   |   | + |
| + |   |   |   |   |

FIG. 1D

|   | A | B | C | + |
|---|---|---|---|---|
| 1 | 4 | 0 | 5 |   |
| 2 | 7 | 2 | 2 |   |
| 3 |   | =\| ⊗ ✓ |   | + |
| + |   |   |   |   |

FIG. 2A

|   | A | B | C | + |
|---|---|---|---|---|
| 1 | 4 | 0 | 5 |   |
| 2 | 7 | 2 | 2 |   |
| 3 |   | =A1+C2 ⊗ ✓ |   | + |
| + |   |   |   |   |

FIG. 2B

|   | A | B | C | + |
|---|---|---|---|---|
| 1 | 4 | 0 | 5 |   |
| 2 | 7 | 2 | 2 |   |
| 3 |   |   |   | + |
| + |   |   |   |   |

|   | A | B | C | + |
|---|---|---|---|---|
| 1 | 4 | 0 | 5 |   |
| 2 | 7 | 2 | 2 |   |
| 3 |   |   |   | + |
| + |   |   |   |   |

|   | A | B | C | + |
|---|---|---|---|---|
| 1 | 4 | 0 | 5 | |
| 2 | 7 | 2 | 2 | |
| 3 |   | 8 |   | + |
| + |   |   |   | |

FIG. 2E

PREVENTING THE INCLUSION OF A REFERENCE TO A HOST CELL IN A FORMULA

CROSS REFERENCE TO OTHER APPLICATIONS

This application is a continuation of co-pending U.S. patent application Ser. No. 11/890,650, entitled PREVENTING THE INCLUSION OF A REFERENCE TO A HOST CELL IN A FORMULA, filed Aug. 6, 2007, which is incorporated herein by reference for all purposes.

BACKGROUND OF THE INVENTION

In typical spreadsheet applications, when entering a formula into a host cell, selecting the host cell into which the formula is being entered results in the insertion of a reference to the host cell in the formula, creating a circular reference which results in an error.

BRIEF DESCRIPTION OF THE DRAWINGS

Various embodiments of the invention are disclosed in the following detailed description and the accompanying drawings.

FIG. 1A illustrates an embodiment of entering a formula editing mode in a host cell.

FIG. 1B illustrates an embodiment of the beginning of a formula that is being entered into a host cell.

FIG. 1C illustrates an embodiment of selecting a cell range while in a formula editing mode in host cell.

FIG. 1D illustrates the value resulting from the formula of FIG. 1C.

FIG. 2A illustrates an embodiment of entering a formula editing mode in a host cell.

FIG. 2B illustrates an embodiment of selecting cells while in a formula editing mode in a host cell.

FIG. 2C illustrates an embodiment in which the host cell is clicked on.

FIG. 2D illustrates an embodiment of completing a formula being entered.

FIG. 2E illustrates the value resulting from the formula of FIG. 2D.

DETAILED DESCRIPTION

Figure 3:
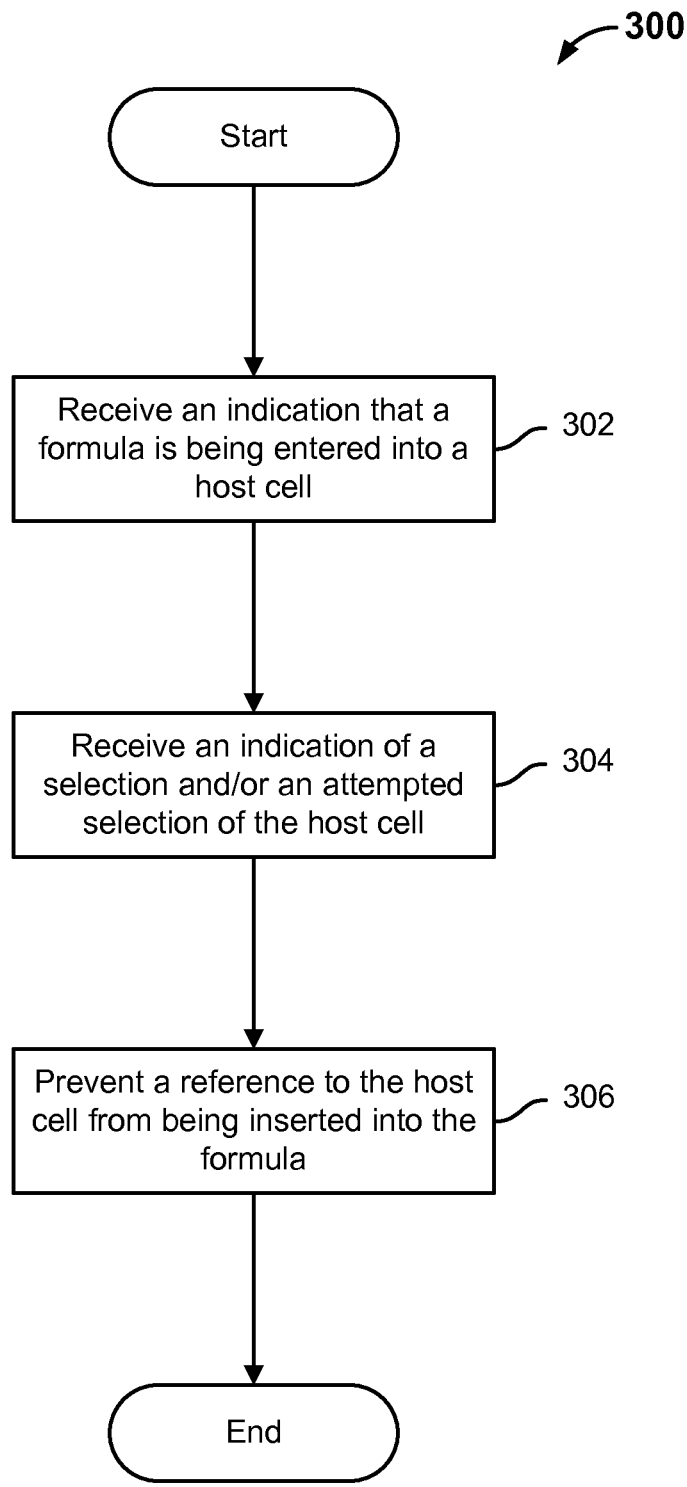
FIG. 3 illustrates an embodiment of a process for preventing the inclusion of a reference to a host cell in a formula being entered into the host cell.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Preventing the inclusion of a reference to a host cell in a formula to avoid a circular reference in the formula is disclosed. In some embodiments, an indication of a selection or an attempted selection of a host cell into which a formula is being entered is received wherein the selection or attempted selection is made by a user via a user gesture associated with adding to a formula a reference to a selected cell or range of cells with respect to which the user gesture is made, and a reference to the host cell is not inserted into the formula in response to the indication. In some embodiments, a host cell is not allowed to be selected.

As used herein, the term "cell" refers to a cell associated with at least standard spreadsheet functionality. The term "at least standard spreadsheet functionality" in the context of a cell includes the ability to define the content of one cell in such a way that the content of the one cell is determined based at least in part on the content of one or more other cells, and the content of the one cell is updated automatically without further human action if the content of one or more of the one or more other cells is changed. As used herein, the term "host cell" refers to a cell in a formula editing mode, i.e., a cell into which a formula is being entered. In some embodiments, cells in a spreadsheet application are organized into one or more individual tables or table objects, each of which includes a desired number of rows and columns of cells. In such cases, a sheet of a spreadsheet document may include a desired number of table objects. Although in many of the examples described herein the cells of a spreadsheet application are organized into such table objects, the techniques described herein may be similarly employed with respect to other cell configurations or organizations, such as the (seemingly) infinite single grid or table of cells in each sheet of some typical spreadsheet applications that includes an unlimited (or very large) number of rows and columns of cells. Although many of the examples provided herein are with respect to a spreadsheet application, the techniques described herein may be similarly employed with respect to any application, spreadsheet or otherwise.

References to one or more cells and/or ranges of cells can be included in a formula. While entering a formula into a host cell, references to one or more cells and/or cell ranges can be manually entered into the formula and/or can be automatically inserted into the formula by clicking on (e.g., using a mouse or other selection tool) or otherwise selecting the one or more cells and/or cell ranges while in the formula editing mode in the host cell. In some embodiments, as disclosed herein, a reference to the host cell into which a formula is being entered is not allowed to be included in the formula so that a circular reference (and resulting error) can be avoided. In some embodiments, a host cell is prevented from being selected, e.g., even when it is attempted to be selected, preventing a reference to the host cell from being inserting into the formula being entered into the host cell. In such cases, for example, when drag (or otherwise) selecting a range of one or more cells while in a formula editing mode in a host cell, the host cell is prevented from being selected or included in the range, e.g., even when it is attempted to be selected or included. Alternatively, in some embodiments, although a host cell may be allowed to be selected, a reference to the host cell is not inserted into the formula being entered into the host cell in response to a selection of the host cell. In such cases, for example, when drag (or otherwise) selecting a range of one or more cells while in a formula editing mode in a host cell, although the host cell may be selected with the range, a reference to the host cell is excluded from a reference to the range inserted into the formula of the host cell in response to the selection of the range. In some embodiments, while in a formula editing mode in a host cell, a reference to the host cell is not allowed to be manually entered into the formula being entered into the host cell.

FIGS. 1A-1D illustrate an embodiment of a formula editing mode. FIG. 1A illustrates entering a formula editing mode in a host cell A6 by entering an equals sign "=" into the host cell. FIG. 1B illustrates the beginning of a formula that is being entered into host cell A6, in this example the function name "SUM". FIG. 1C illustrates an embodiment of selecting a cell range while in a formula editing mode in a host cell A6 and the corresponding automatic insertion of a reference to the cell range into the formula being entered into host cell A6. In the example of FIG. 1C, in some embodiments, even if the selection tool is dragged over or clicked on host cell A6 while selecting the range, host cell A6 is prevented from being selected with the range and/or (even if selected) is not included in the reference of the range inserted into the formula. In some embodiments, manual entry of a reference to the host cell, for example by typing the cell address "A6" or a range including the host cell, is prevented. FIG. 1D illustrates the value resulting from the formula of FIG. 1C, specifically the sum of the values of cells A1-A5, which in some embodiments is the same as shown in FIG. 1D regardless of whether the user included host cell A6 when selecting the range.

Figure 2E:
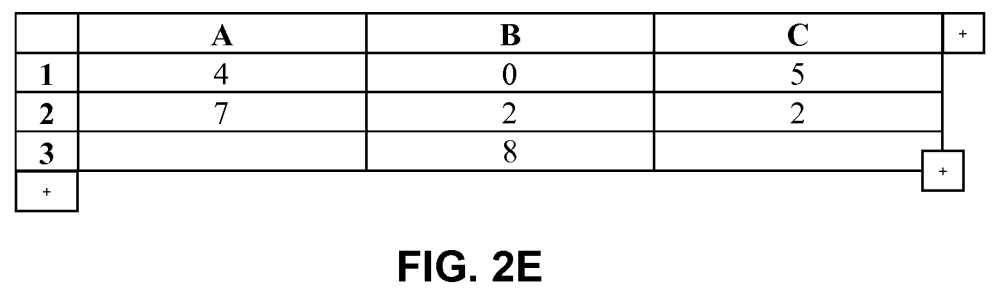

FIGS. 2A-2D illustrate an embodiment of a formula editing mode. FIG. 2A illustrates entering a formula editing mode in a host cell B3 by entering an equals sign "=" into the host cell. FIG. 2B illustrates selecting cells A1 and C2 while in a formula editing mode in host cell B3 and the corresponding automatic insertion of references to the selected cells into the formula being entered into host cell B3. FIG. 2C illustrates a formula editing user interface or HUD (head-up display) 200 that has been dragged off of host cell B3 and an attempt to select host cell B3. As depicted in FIG. 2C, host cell B3 is prevented from being selected and no reference to host cell B3 is entered into the formula. FIG. 2D shows the completed formula, and FIG. 2E illustrates the resulting value in host cell B3.

FIG. 3 illustrates an embodiment of a process for preventing the inclusion of a reference to a host cell in a formula being entered into the host cell. In some embodiments, process 300 is employed with respect to FIGS. 1C and 2C to prevent the inclusion of a reference to the host cell in the formula being entered into the host cell. Process 300 starts at 302 at which an indication that a formula is being entered into a host cell is received. In some embodiments, the indication that a formula is being entered is received at 302 in response to an equals sign "=" being entered into the host cell. At 304, an indication of a selection and/or an attempted selection of the host cell is received. In some embodiments, the selection or attempted selection is made by a user via a user gesture associated with adding to the formula a reference to a selected cell or range of cells with respect to which the user gesture is made. In various embodiments, the user gesture comprises clicking on or otherwise selecting the host cell, clicking and dragging across or otherwise selecting a range of cells that includes the host cell, entering into a formula editing interface a cell address or other cell identifier associated with the host cell or a range of cells that includes the host cell, etc. At 306, a reference to the host cell is prevented from being inserted into the formula, and process 300 ends. In some embodiments, 306 includes not allowing the host cell to be selected. In some embodiments, 304 includes receiving an indication of a selection of a range or a set of cells including the host cell, and 306 includes inserting references to each of the cells of the range or set other than the host cell in the formula. In some embodiments, 304 includes receiving one or more indications of selections of one or more other cells and/or ranges of other cells, and 306 includes inserting references to the one or more other cells and/or cell ranges into the formula.

As described herein, not allowing a host cell to be selected and/or not allowing a reference to a host cell to be inserted into a formula being entered into the host cell prevents a circular reference from being included in a formula as well as errors associated with including a circular reference in a formula.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving an indication of an attempted user gesture on an electronic device for inserting into a formula being entered into a host cell of a spreadsheet presented on a display of the electronic device a reference to the host cell of the spreadsheet, wherein the spreadsheet comprises a plurality of cells; and
disallowing the attempted user gesture for inserting the reference to the host cell of the spreadsheet to prevent a circular reference from being inserted into the formula being entered into the host cell of the spreadsheet, wherein disallowing the attempted user gesture comprises precluding a selection of the host cell of the spreadsheet.

2. A method as recited in claim 1, wherein the attempted user gesture comprises an attempted selection of the host cell.

3. A method as recited in claim 1, wherein the attempted user gesture comprises attempted user entry into a formula editing interface of a reference to the host cell.

4. A method as recited in claim 1, wherein the attempted user gesture further comprises an indication to include in the formula being entered into the host cell a reference to each of one or more other cells and inserting into the formula a reference to each of the one or more other cells in response to the attempted user gesture.

5. A method as recited in claim 1, wherein the host cell is in a formula editing mode.

6. A method as recited in claim 1, wherein the host cell is associated with at least standard spreadsheet functionality.

7. A system, comprising:
a processor configured to:
receive an indication of an attempted user gesture for inserting into a formula being entered into a host cell of a spreadsheet presented on a display of an electronic device a reference to the host cell of the spreadsheet, wherein the spreadsheet comprises a plurality of cells; and disallow the attempted user gesture for inserting the reference to the host cell of the spreadsheet to prevent a circular reference from being inserted into the formula being entered into the host cell of the spreadsheet, wherein disallowing the attempted user gesture comprises precluding a selection of the host cell of the spreadsheet; and a memory coupled to the processor and configured to provide instructions to the processor.

8. A system as recited in claim 7, wherein the attempted user gesture comprises an attempted selection of the host cell.

9. A system as recited in claim 7, wherein the attempted user gesture comprises attempted user entry into a formula editing interface of a reference to the host cell.

10. A system as recited in claim 7, wherein the attempted user gesture further comprises an indication to include in the formula being entered into the host cell a reference to each of one or more other cells and inserting into the formula a reference to each of the one or more other cells in response to the attempted user gesture.

11. A system as recited in claim 10, wherein the reference to each of the one or more other cells comprises a determined range of cells exclusive of the host cell.

12. A system as recited in claim 7, wherein the host cell is in a formula editing mode.

13. A system as recited in claim 7, wherein the host cell is associated with at least standard spreadsheet functionality.

14. A computer program product embodied in a non-transitory computer readable medium and comprising computer instructions to:

receive an indication of an attempted user gesture on an electronic device for inserting into a formula being entered into a host cell of a spreadsheet presented on a display of the electronic device a reference to the host cell of the spreadsheet, wherein the spreadsheet comprises a plurality of cells; and disallow the attempted user gesture for inserting the reference to the host cell of the spreadsheet to prevent a circular reference from being inserted into the formula being entered into the host cell of the spreadsheet, wherein disallowing the attempted user gesture comprises precluding a selection of the host cell of the spreadsheet.

15. A computer program product as recited in claim 14, wherein the attempted user gesture comprises an attempted selection of the host cell.

16. A computer program product as recited in claim 14, wherein the attempted user gesture comprises attempted user entry into a formula editing interface of a reference to the host cell.

17. A computer program product as recited in claim 14, wherein the attempted user gesture further comprises an indication to include in the formula being entered into the host cell a reference to each of one or more other cells and inserting into the formula a reference to each of the one or more other cells in response to the attempted user gesture.

18. A computer program product as recited in claim 17, wherein the reference to each of the one or more other cells comprises a determined range of cells exclusive of the host cell.

19. A computer program product as recited in claim 14, wherein the host cell is in a formula editing mode.

20. A computer program product as recited in claim 14, wherein the host cell is associated with at least standard spreadsheet functionality.

* * * * *